United States Patent [19]

Raad

[11] Patent Number: 5,350,776

[45] Date of Patent: Sep. 27, 1994

[54] CAMOUFLAGE FOAMED POLYMER WITH COLORED PATTERN MASS

[76] Inventor: Eduardo A. Raad, P.O. Box 09-01-4553, Guayaquill, Ecuador

[21] Appl. No.: 127,228

[22] Filed: Sep. 24, 1993

Related U.S. Application Data

[62] Division of Ser. No. 45,192, Apr. 13, 1993, Pat. No. 5,273,697.

[51] Int. Cl.$^5$ .......................... C08J 9/232; C08J 9/24
[52] U.S. Cl. .................................... 521/54; 521/59; 521/84.1; 521/139; 521/140; 521/148; 521/150
[58] Field of Search ............... 521/54, 59, 84.1, 140, 521/139, 148; 264/45.4, 122, 246

[56] References Cited

U.S. PATENT DOCUMENTS

| | | | |
|---|---|---|---|
| 2,054,848 | 9/1936 | Bowker | 428/15 |
| 3,119,729 | 1/1964 | Ljungo | 428/196 |
| 4,142,015 | 2/1979 | Bienz | 428/195 |
| 4,243,709 | 1/1981 | Morton | 428/195 |
| 4,417,932 | 11/1983 | Breitsheidel et al. | 428/207 |
| 4,605,584 | 8/1986 | Herr, Jr. et al. | 428/142 |
| 4,699,820 | 10/1987 | Herr, Jr. et al. | 428/142 |

Primary Examiner—Morton Foelak
Attorney, Agent, or Firm—J. Sanchelima

[57] ABSTRACT

A foamed elastomeric polymer with a camouflage appearance on its surface and throughout its mass, characterized by distinct, randomly sized regions of various colors, having curved, nonangular borders with substantially no blend of colors, and being free from gas pockets and blisters. A process for manufacturing a foamed elastomeric polymer of the above description.

16 Claims, 1 Drawing Sheet

CAMOUFLAGE FOAMED POLYMER WITH COLORED PATTERN MASS

This is a Division of application Ser. No. 08/045,192, filed on Apr. 13, 1993, now U.S. Pat. No. 5,273,697.

BACKGROUND OF THE INVENTION

1. Field of the Invention

The present invention relates to foamed elastomeric polymers with a particular color scheme, specifically a visual camouflage appearance. More particularly the invention relates to a camouflage pattern characterized by distinct, randomly sized regions of various colors, each such region having nonangular borders and being a single, uniform color with substantially no blending of colors within it, with all color changes occurring at interfaces of distinct colored regions. The material is also free from marring by large gas pockets in and on the surface thereof. The invention further relates to a process for manufacturing the foamed elastomeric polymer.

2. Description of the Prior Art

Foamed materials have long been utilized in the polymers industries. Foamed polymers generally exhibit greater strength than an identical mass of the unfoamed polymer, and in many cases drastically reduces the thermal conductivity of the material because of the air contained in the cells of the foam.

Camouflage designs for foamed materials are likewise known. Such designs most frequently are applied by painting the outer surface of the foam. Attempts to achieve an internal camouflage appearance have resulted either in an unacceptable visual camouflage effect characterized by smeared, blended colors, or simply alternating bands of color with no random distribution of distinct areas of color, and thus no camouflage effect at all.

U.S. Pat. No. 4,417,932 to Brietscheidel et al. discloses a process for producing sheets of stratified material from synthetic resin foam particles. Foam particles are scattered onto a conveying means, and superficially preheated during conveyance to a temperature between 100° C. and 160° C. The particles are then fed into a free-fall zone, in which they are further heated to a temperature of at least 200° C. After piling the particles onto a support surface, a sheetlike layer is formed by compacting the particles, and the sheet is then sized with simultaneous cooling.

U.S. Pat. No. 4,142,015 to Bienz discloses a thermal and visible camouflage for use on military equipment such as tanks. A layer of foamed plastic with a randomly varying insulating effect is applied to the outer surface of heat-generating equipment. Visual camouflage may be painted onto the plastic, or coatings under the plastic layer may also be used.

U.S. Pat. No. 4,243,709 to Morton discloses a method for making camouflage from sheets of multi-colored coated fabric. A film of camouflage polyvinyl chloride film is applied to each side of the fabric. The films are formed by applying plastisols of different colors to a carrier web, then overcoating the colored portions and any uncoated portions with a plastisol of another color. The films are then bonded to the fabric and the web is stripped from the outsides of the fabric. The multi-colored fabrics are cut into sheets which are attached to a net to make the camouflage screen.

U.S. Pat. No. 3,119,729 to Ljungbo discloses a flameproof camouflage net and method of manufacturing it. An apertured, flameproof sheet of plastic, or pieces thereof, are bonded by an adhesive to a net.

U.S. Pat. No. 2,054,848 to Bowker discloses a method of coloring thermoplastic materials to simulate the appearance of natural rocks and minerals, such as onyx. The thermoplastic is kneaded at elevated temperature with a solvent. The solvent is driven off and the material is formed into slabs by heated rolls. Coloring agents are applied to each slab, along with plasticizers as desired. An uncolored slab is superimposed over the colored slab, and the two slabs are worked by heated rolls until the desired effect is obtained.

A need thus exists for a camouflage material which has a nonrepetitive camouflage appearance on its surface and throughout its internal mass wherein virtually no blending of colors occurs at the interfaces of distinct colored regions.

SUMMARY OF THE INVENTION

Applicant has unexpectedly discovered a cross-linked, foamed elastomeric polymer with a nonrepetitive, visual camouflage appearance on its surface and throughout its internal mass.

Applicant has also discovered a novel process by which a camouflage material can be obtained wherein uncured cross-linkable elastomeric polymer pieces are first compounded in a mixing means with a foaming agent, commonly referred to in the art as a "blowing agent," a cross-linking agent, and coloring compounds. The resulting colored batches of polymer, having the blowing agent and cross-linking agent internally dispersed, are then cut into small pieces or strips of a desired size with a cutting means. Finally, the colored pieces are cured by foaming and cross-linking. This is accomplished by compressing the materials in a curing means to a pressure of up to about 2000 psi (144 kg$_f$/cm$^2$) while heating to a temperature of between about 100° C. and about 500° C. During the curing step, the cross-linking and blowing agents which have previously been compounded into the polymer pieces are activated. The cross-linking of polymer molecules creates a rigid, unified material from the separate polymer pieces. The blowing agent, upon decomposition, creates gas bubbles which effect a foamed, cellular structure within the material. The materials are then depressurized, and the cured, foamed material is recovered from the curing means and cooled.

A third embodiment of the present invention is a novel material having a visual camouflage appearance obtained by the process comprising compounding uncured batches of the polymer in a mixing means with a blowing agent, a cross-linking agent, and coloring agents to obtain colored, uncured polymer pieces with internally dispersed blowing and cross-linking agents. The colored, uncured cross-linkable elastomeric polymer pieces are fed into a curing means and cured by foaming and cross-linking the colored polymer pieces. This is achieved by compressing the materials in the curing means to a pressure of up to about 2000 psi (144 kg$_f$/cm$^2$) while heating to a temperature of between about 100° C. and about 500° C. The materials are then cooled and depressurized, and the cured, foamed material is recovered from the curing means.

BRIEF DESCRIPTION OF THE DRAWINGS

The foregoing summary, as well as the following detailed description of a preferred embodiments of the invention, will be better understood when read in conjunction with the appended drawings in which.

DETAILED DESCRIPTION OF THE INVENTION

Figure 1:
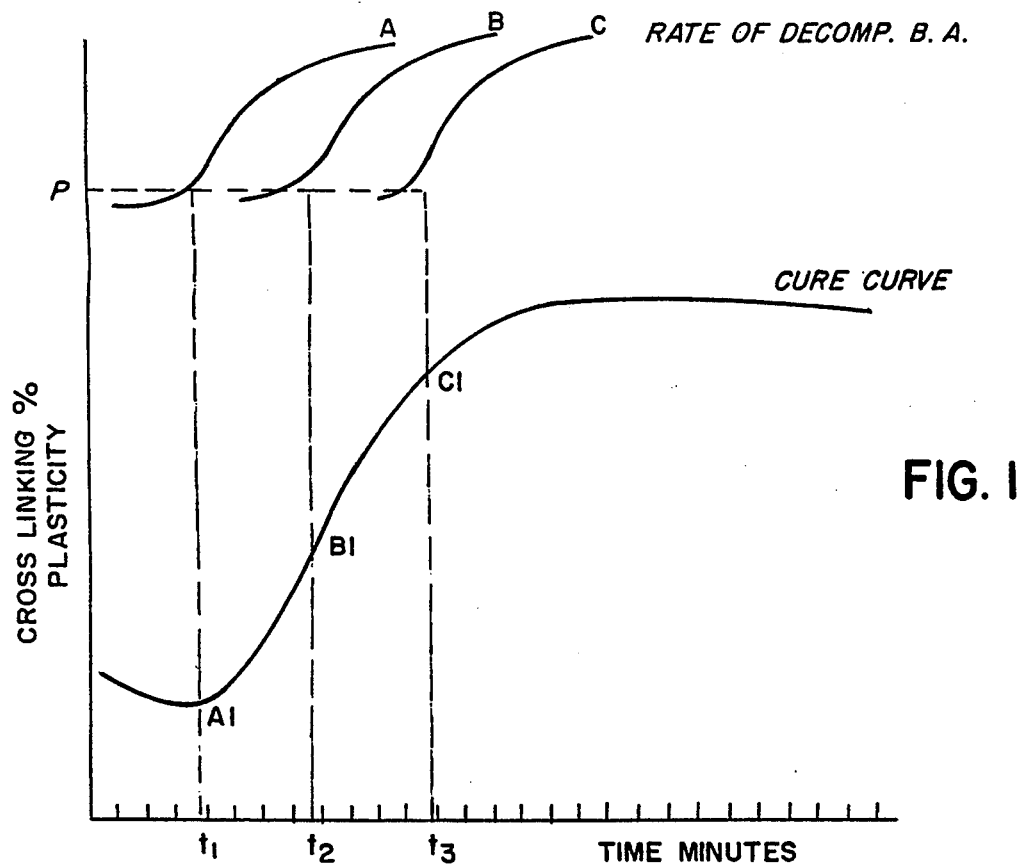
FIG. 1 is a graph of pressure and percentage of cross-linking versus time, illustrating the interaction between the rate of cure and the rate of decomposition of three blowing agents which decompose at different rates.

The camouflage material of the invention constitutes foamed polymers made from cross-linked elastomeric polymers. More particularly, they are a foamed polymeric material, made from cross-linked elastomeric polymer, having a nonrepetitive camouflage appearance on its surface and throughout its internal mass. It is distinguished from the prior art in that it has a nonrepetitive, visual camouflage appearance throughout its entire structure.

The novel material of the invention has a high-quality visual appearance and its shock-absorbing and thermal capacity as a foam renders it uniquely advantageous for many commercial applications. It may be used as insulation in, for example, clothing and beverage can holders, as body protective gear such as helmets, in a wide variety of sporting goods such as foamed diving suits, hunting equipment, and in protective sport padding equipment such as for baseball and football, in footwear, and in military equipment, besides many other uses where a camouflage appearance is desired.

The camouflage material is preferably produced by a curing procedure which involves controlling the rheological properties of the polymer and the relationship between the cure rate and the blowing agent decomposition rate. Control of relationship between the cure rate and the blowing agent decomposition rate enables one skilled in the art to avoid both blistering and an unacceptable blending of colors in the material. The process consists of the following steps: compounding uncured polymer batches by mixing the blowing, cross-linking, and coloring agents with the polymer in a mixing means, cutting the batches of colored polymer into small pieces, feeding the colored, compounded pieces into a curing means, curing them with heat and pressure for a desired time period, depressurizing the cured material, and removing the cured material from the curing means and cooling it.

The process begins by mixing the uncured polymer to be foamed with the blowing agent, the curing agent, and coloring agents to form batches of various colors of foamable, cross-linkable elastomeric polymer. The uncured cross-linkable elastomeric polymer can be selected according to the properties desired for the final product. Any foamable elastomeric polymer may be used. Uncured polymers commonly used include but are not limited to polyurethane, polyethylene, polypropylene, neoprene, isoprene, ethyl vinyl acetate copolymer (EVA), butadiene-acrylonitrile copolymer (NPR), and styrene-butadiene copolymer (SBR) and mixtures thereof. Halogenated derivatives of the foregoing polymers are also acceptable, as well as mixtures thereof.

While specific polymer species have been recited, it should be recognized that other polymers may also be acceptable without departing from the spirit and scope of the invention.

The foamable polymer pieces may be compounded in batches of various colors in a conventional mixing apparatus, such as Banbury mixer, and calendared to form sheets of different colors. To obtain pieces of differing sizes and shapes, a rotary cutter with a variable knife speed and a feeder with a strip cutter and variable speed and feeding angle are used. Other methods of preparing the polymeric pieces may be used without departing from the scope of the invention. Extrusion, for example, may be used to obtain fixed cylindrical or amorphous pieces to resemble pebbles, streaks, and other structures.

In the art of foamed polymers the use of blowing or foaming agents is well known. Any blowing agent acceptable in this art may be used in the novel process described herein. Azo compounds, N'-nitroso compounds and sulfonyl hydrazide compounds are three particularly preferred types of blowing agents. Furthermore, mixtures of these groups of compounds may also be used herein. Among azo compounds, azodicarbonamide, azobisisobutyronitrile, and diazoaminobenzene are preferred blowing agents. Among the nitroso compounds, N,N'-dimethyl, N,N'-dinitrosoterephthalamide, and N,N'-dinitrosopentamethylenetetramine are preferred blowing agents. Exemplary sulfonyl hydrazide blowing agents include: benzenesulfonyl hydrazide, toluene-(4)-sulfonyl hydrazide, benzene-1,3-disulfonylhydrazide, diphenylsulfon-3,3'-disulfonyl hydrazide, and 4,4'oxybis(benezenesulfonyl hydrazide). Mixtures of the blowing agents may also be used.

A wide variety of cross-linking agents may also be used including without limitation organic peroxides such as dicumyl peroxide. Other known cross-linking agents may also be used, such as rubber vulcanizing agents.

In addition to the coloring, blowing, and cross-linking agents, additional materials may also be compounded into the uncured polymer batches in order to modify the rheological properties and the activation of the blowing agent and curing agent of the foamed polymer. These additional materials may include viscosity-modifying agents, dispersion agents, blowing agent activators, cross-linking agent activators, and fillers. These agents are useful to enable one skilled in the art to design a compound which will produce a foam with a desired texture and appearance in accordance with the process here disclosed.

Exemplary viscosity-modifying agents include natural rubber and other polymers with high viscosity. They are added in amounts up to about 30% by weight, preferably up to about 25% by weight, and more preferably to about 20% by weight.

Exemplary dispersion agents include stearic acid and other surfactants, added in amounts of up to about 10% by weight, preferably up to about 5% by weight, and more preferably from about 1% to about 3% by weight.

Exemplary blowing agent activators include zinc oxide, dibasic lead phthalate, ethylene glycol, and urea and derivatives thereof. They may be added in up to about 15% by weight, preferably up to about 10% by weight, and more preferably up to about 5% by weight.

Exemplary filler materials may be either active or inert. Active fillers include metal silicates such as aluminum silicate, added in amounts up to about 50% by weight, preferably up to about 25% by weight, and more preferably up to about 20% by weight. Inert fillers include metal carbonates, such as calcium carbonate, added in amounts up to about 60% by weight, preferably up to 55% by weight, and more preferably up to 50% by weight.

Exemplary tackifiers include hydrocarbon resins such as Strukol 60 NSF, added in amounts up to 15% by weight, preferably up to about 10% by weight, and more preferably up to about 5% by weight. Tackifiers also alter the rheological properties of the compound. Other tackifiers may be selected from the group consisting of synthetic or natural resins, olefins, oils, soaps, and derivatives and combinations thereof.

After the uncured polymer pieces are compounded, they are cut into small pieces by conventional means known in the art, such as a rotary cutter, and then cured. Differently colored compounded polymer pieces are fed into the curing means and cured by a cross-linking reaction among the polymer molecules; simultaneously, the blowing agent decomposes exothermically into a gas, increasing the pressure within the mold and also accelerating the rate of cross-linking. The process can be used to obtain either open-celled or closed-cell foams by partially or completely filling the mold, and by heating the material at atmospheric pressure or at higher pressures, respectively. To obtain a closed-cell foam, the polymer pieces are compressed in the curing means to a pressure of between 0 psi and about 2000 psi (144 kg$_f$/cm$^2$), preferably between about 500 psi and about 900 psi, and more preferably between 650 psi (45.7 kg$_f$/cm$^2$) and about 750 psi (52.7 kg$_f$/cm$^2$). If an open-cell foam is desired, the curing means is only partially filled and the materials are not pressurized, remaining instead at atmospheric pressure. If desired, an open-celled foam of still greater cell size could be created by curing the material under vacuum (less than atmospheric pressure). To activate the cross-linking and blowing agents the materials are heating in the curing means to a temperature of between about 100 degrees C. and about 500 degrees C., preferably between about 130 degrees C. and about 200 degrees C., and more preferably between about 150 degrees C. and about 175 degrees C. In addition to curing the material with heat, other means of curing, such as microwave or similar irradiation, may be used.

The curing step is a critical step in the process. The temperature, pressure and curing time are adjusted for a particular combination of blowing agent, cross-linking agent, cross-linkable elastomeric polymer, and curing means geometry to vary the rate of cross-linking such that the camouflage piece cures completely and has a visual camouflage appearance throughout its mass and contains substantially no blisters. Blisters are void spaces within the foam that substantially exceed the size of the foam cells. They may be created by blowing agent or air bubbles which become trapped in the polymer during curing. In general, the higher the temperature, the greater is the rate of cross-linking.

The rate of cross-linking and blowing agent decomposition cannot be measured directly. A cone rheometer, however, may be used to analyze an elastomeric specimen. This apparatus allows the measurement of small pressure changes within the polymer while simultaneously measuring the torque necessary to shear the polymer in an oscillatory manner.

Three particularly important features in the curing step are the rate of decomposition of the blowing agent, the rate of cure of the elastomeric polymer, and the rheological properties of the foamed polymer. Variations in rheological properties can be obtained by varying the type and amount of additives used. Particularly advantageous additives may be selected from hundreds known in the art and available in the market.

The relationship between the rate of cross-linking and the blowing agent decomposition rate is crucial to proper curing. If the rate of cross-linking is too slow, the blowing agent will decompose into a high pressure gas before the material has reached an adequate plasticity by cross-linking, which leads to an unacceptable blending or swirling of the colors of the polymer pieces as further cross-linking occurs. On the other hand, if the rate of cure is too fast, the colored pieces will prematurely lose their plasticity, becoming too rigid to adhere together when the blowing agent increases pressure within the material. In this case, when the pressure is released and the material is allowed to expand freely, blisters will be created throughout the material by trapped air or blowing agent bubbles located in the interstices of the pieces.

Figure 2:
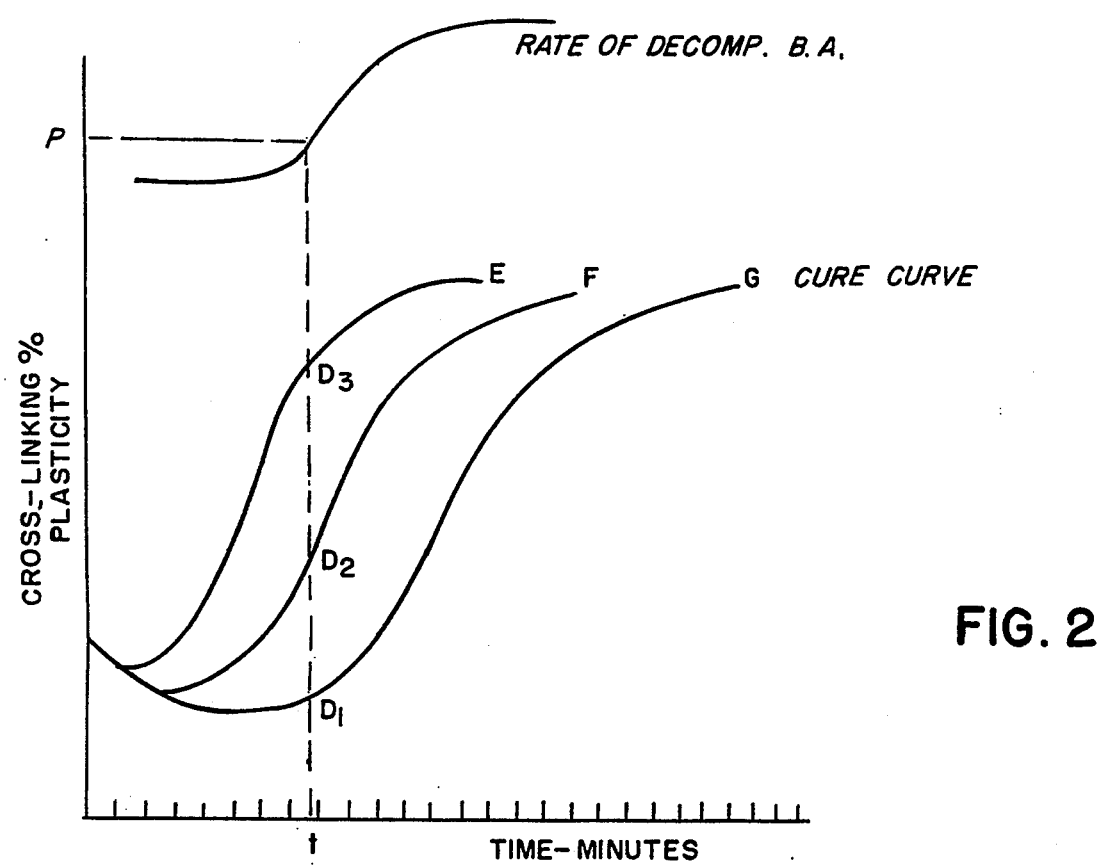
FIG. 2 is a graph of pressure and percentage of cross-linking versus time illustrating the interaction between the rate of decomposition of a single blowing agent and three different, successively faster cure rates.

The relationship between cross-linking rate and blowing agent decomposition rate is illustrated in FIGS. 1 and 2. Curve C and point C1 in FIG. 1 illustrate the relationship between the rate of blowing agent decomposition and cross-linking rate. Curve C indicates a blowing agent which decomposes after most of the cross-linking has already occurred. Thus the material will be too rigid to expand without blistering because of the gases trapped in the interstices of the foam pieces.

An example of a blowing agent and cross-linking curve wherein the material is cross-linked too slowly is provided by Curve A and Point A1 in FIG. 1. Curve A indicates a blowing agent that decomposes very rapidly in the curing process. Thus, at pressure P at time T1, very little cross-linking has occurred as the blowing agent decomposes. Since little cross-linking has occurred, the material is quite fluid, and as the blowing agent decomposes throughout the material, the colors are smeared by small pressure differences among and within the polymer pieces. Smearing is magnified by the heat buildup arising from the exothermic blowing agent decomposition reaction.

By contrast, with the proper selection of polymer, blowing and cross-linking agents, and additives, it is possible to achieve an optimal cross-linking rate for a particular blowing agent decomposition rate in view of the rheological properties of the polymer. This is indicated by Curve B and Point B1 in FIG. 1. Cross linking has progressed to a sufficient point to prevent the polymer pieces from moving with respect to each other as the blowing agent decomposes. It has not, however, progressed too far, and the polymer pieces are sufficiently pliable and display sufficient tackiness to cross-link and adhere properly together without trapping air or gas bubbles. Blistering will not occur, and a visual camouflage appearance will be obtained without a blend or smearing of colors and without blistering.

FIG. 2 illustrates how the rate of cure for a particular compound may be modified with respect to a particular blowing agent system, which includes the blowing agent, blowing agent activator, and other additives selected to affect the curing process such as tackifiers. In Curve E, by the time the blowing agent has decomposed sufficiently to foam the material, cross-linking has already proceeded beyond an excessive stiffening point, and the polymer pieces will be too rigid and insufficiently tacky to cross-link and adhere together without trapping air or gas, leading to blisters. Curve G, on the other hand, illustrates a curing rate which is too slow, as indicated by point D1. At point D1, very little cross-linking has occurred; the material is very fluid, and a blend or swirl of colors with a poor camouflage pattern will be produced by further cross-linking. Curve F, by contrast, illustrates a cross-linking rate which is neither too fast nor too slow; thus, upon decomposition, the blowing agent gases will be dispersed throughout the polymer, and the medium is sufficiently stiff to prevent a swirl or blend of colors as further cross-linking occurs.

After the curing step is complete, the materials in the curing means are decompressed, removed from the curing means, and allowed to cool. The order of the cooling step, however, is not critical and the material may be cooled before being removed from the curing means. The decompression step functions to remove the blowing agent decomposition gases and air bubbles from the polymer and to halt the cross-linking reaction. It also foams the material further as the gases expand the cellular structure created by the blowing agent decomposition.

The foamed material may be removed from the curing means manually or automatically, and the removal may also occur after mechanical or chemical processing occurs, such as drying, cutting or washing.

When the material has cooled sufficiently, the outer skin of the cured, foamed camouflaged material must be removed to reveal the desired camouflage pattern. The skin may be removed by any method known in the art, such as cutting, sliding, or grinding, depending on the shape desired in the final product.

If the elastomeric polymer selected continues to exhibit smearing or blending of colors regardless of cure rates or blowing agent systems selected, the viscosity at cross-linking temperature of the uncured elastomeric polymer should be raised to reduce the tendency of the material to flow at the higher temperature. This may be done by using an uncured elastomeric polymer with a lower Malt Index (higher viscosity) at cross-linking temperature, or by varying the type and amount of additives capable of modifying the rheological properties of the compound, such as plasticizers, tackifiers, and fillers by way of nonlimiting example.

By following the above process together with the above described relationships, one skillful in the art of compounding foams can, without undue experimentation, formulate an acceptable visual camouflage compound with no blistering or smearing of colors from the many materials available in the art, such as blowing agents, activators, plasticizers, polymers, cross-linking agents, etc. The preferred way to obtain the correct formulation is by observing the visual appearance of the cured foamed material to determine if either blisters or smearing of colors has occurred. If so, the formulation should be adjusted according to the above parameters until the desired pattern is obtained without blisters or smearing of colors. A cone rheometer is preferentially used to more accurately control the process.

Prior attempts to obtain such materials like the present camouflage material have not been successful. Some of these attempts have resulted in a poor camouflage appearance, both on the surface of the material and throughout its mass. Other efforts have not produced a noticeable camouflage appearance at all, characterized by randomly sized areas of distinct colors, and being marred by large air pockets, known as blisters. The blister are distributed throughout the material instead of the foam with consistent, uniformly sized foam cells. In both cases the appearance of the material renders it commercially unviable.

The following Examples are given to illustrate the invention, but are not to be limiting thereof. All percentages given throughout the specification are based upon weight of the base polymer or polymers used unless otherwise indicated and total 100% of the final product.

EXAMPLE 1

This Example demonstrates the preparation of a camouflage material according to the invention. The following materials were used in the amounts recited:

| Material | Object | Parts By Weight A | Range |
|---|---|---|---|
| Ethylene vinyl acetate (18% vinyl acetate content) | Elastomeric polymer | 100 | 100 |
| Natural Rubber | Viscosity modifier | 5 | 5–20 |
| Aluminum Silicate | Active filler to reinforce and to increase viscosity | 10 | 0–20 |
| Calcium Carbonate | Inert filler to lower costs costs and increase viscosity | 10 | 0–50 |
| Dicumyl peroxide | Cross-linking agent | 1 | 0.5–1.5 |
| Azodicarbonamide | Blowing agent | 6 | 0.1–10 |
| Zinc Oxide | Blowing agent activator to accelerate decomposition rate | 5 | 1–8 |
| Stearic Acid | Dispersion agent | 1 | 1–3 |
| Strukol 60 NSF | Tackifier; homogenizes and improves cell quality | 3 | 0–6 |
| Coloring Agents | To impart camouflage colors | 1 | 0.1–5 |

Column A shows parts by weight for Example 1
Range Column shows an acceptable, nonlimiting range for each for each additive to illustrate their effects A batch of foamable polymer is prepared separately for each color desired in the final material by weighing the polymer, blowing agent, cross-linking agent, coloring agent, and other materials and mixing them separately by conventional methods, for example a Banbury mixer, mixing mills, or other methods known in the art, to obtain different batches of colored, uncured elastomeric polymer compound. Each colored batch is then formed into pieces of a specific and proportional size, shape, and weight, according to the final camouflage pattern desired.

For this example, a batch for each of four colors was compounded separately in a Banbury mixer and calendared to form thin sheets of different colors: black, dark green, light green, and beige. To obtain pieces of differing sizes and shapes, a rotary cutter with a variable knife speed and cutting angle were used. By this means, there may be obtained pieces with a wide range of shapes and sizes, such as squares, rectangles, trapezoids or narrow strips. In this example, narrow strips were cut in the following sizes: black, 800×25×0.6 mm.; dark green, 800×25×1.8 mm; light green, 800×25×1.8 mm; beige, 800×25×1.8 mm.

The colored pieces were then arranged lengthwise forming groups in the following pattern: one light green, 1 black, 1 beige, 1 black, one light green, one black, and 1 dark green. This ratio corresponds to the final desired camouflage pattern of 40 percent light green, 20 percent dark green, 20 percent beige, and 20 percent black.

This ratio was used to obtain a realistic sylvan camouflage pattern. A flat compression mold 900×600×9 mm was filled with 5.5 kilograms of the compound according to the above arrangement. The preferred way of curing the compound is by compression molding. The curing parameters used were 60 kilograms force per centimeter squared (60 kg$_f$/cm$^2$), 165 degrees centigrade (C), and a 12 minute batch curing time. At the beginning of the cycle, the mold was pressure-purged by applying a pressure of 60 kg$_f$/cm$^2$ to the mold and releasing it to remove trapped air from the compound. The pressure of 60 kg$_f$/cm$^2$ was reapplied, the material was heated to 165° C., and the compound was cured for 12 minutes, during which time the blowing agent decomposed. The pressure was then released, allowing the cured polymer to expand, and the material was removed from the mold and cooled.

This process yielded a micro-cellular expanded foamed slab with no blisters and no smearing of colors. Other suitable methods of curing, such as rotocuring, may be used without departing from the scope of the invention. The final appearance of the slab was also evaluated by removing a thin sheet 1.5 millimeters in thickness, which was sliced from the slab with a splitting machine. The surface of the internal material exhibited a camouflage effect with no blistering and no smearing of colors. The sample material was used to fabricate bottle protectors, masks, to cover helmets, canteens, and boats. The material was readily moldable and easily applied to other objects.

EXAMPLE 2

A second batch of foamed polymer was prepared using identical amounts of all components except dicumyl peroxide (the cross-linking agent), which was used at 0.5 parts instead of 1 part. The identical procedure was followed to create a foamed polymer which exhibited a smearing of colors. This is in accordance with the disclosed relationship between the rates of cross-linking and blowing agent decomposition. The slower cross-linking rate resulted in a material having relatively little cross-linking as the blowing agent decomposed. As a consequence, the colors were smeared by small, localized pressure differences within and among the polymer pieces.

EXAMPLE 3

A third batch of foamed polymer was prepared using identical amounts of all components in Example 1 except dicumyl peroxide (the cross-linking agent), which was used at 2 parts by weight instead of 1 part. A procedure identical to that for Example 1 was followed, yielding a batch of polymer with high levels of blisters in the material, in accordance with the disclosed relationship between the rates of cross-linking and blowing agent decomposition. The faster cross-linking rate resulted in a material having a relatively great amount of cross-linking as the blowing agent decomposed. Consequently, the material was relatively rigid at the point of blowing agent decomposition, creating pockets of trapped gas which were not dispersed throughout the medium. Upon depressurization, these gas pockets created blisters.

The invention being thus described, it will be obvious that the same may be varied in many ways. Such variations are not to be regarded as a departure from the spirit and scope of the invention and all such modifications are intended to be included within the scope of the following claims.

What is claimed is:

1. A foamed elastomeric material having a nonrepetitive, visual camouflage appearance on its surface and throughout its internal mass, made from cross-linked elastomeric polymers by a curing and foaming process, which comprises:
   a) compounding in a mixing means various batches of materials comprising
      (1) uncured cross-linkable elastomeric polymer pieces,
      (2) a coloring agent, each said batch having a single, uniform color,
      (3) a blowing agent, which during a curing step forms dispersed bubbles within the elastomeric polymer pieces, and
      (4) a cross-linking agent;
   b) cutting the compounded batches of uncured polymer into small pieces,
   c) feeding into a curing means said small pieces of uncured, compounded elastomeric polymer, each of said small pieces having a single, uniform color with different pieces having different colors,
   d) curing said small pieces of uncured, compounded elastomeric polymer by simultaneously foaming and cross-linking the uncured cross-linkable elastomeric polymer pieces by compressing the materials in the curing means at a pressure of up to about 2500 psi while heating the materials to a temperature of between about 100° C. and about 500° C. to create a cured elastomeric polymer;
   e) depressurizing the cured elastomeric polymer to remove excess blowing agent bubbles and to foam the material;
   f) recovering a cured foamed material; and
   g) removing the outer skin of the cured foamed material to obtain a nonrepetitive, visual camouflage appearance.

2. The foamed polymeric material of claim 1, wherein the material is used as insulation.

3. The foamed polymeric material of claim 1, wherein the material is used in beverage can holders.

4. The foamed polymeric material of claim 1, wherein the material is used in body protective devices.

5. The foamed polymeric material of claim 4, wherein the body protective device is a knee pad.

6. The foamed polymeric material of claim 4, wherein the body protective device is an elbow pad.

7. The foamed polymeric material of claim 4, wherein the body protective device is a helmet.

8. The foamed polymeric material of claim 1, wherein the material is used in sporting goods.

9. The foamed polymeric material of claim 8, wherein the sporting goods include water diving suits.

10. The foamed polymeric material of claim 8, wherein the sporting goods are weapons.

11. The foamed polymeric material of claim 8, wherein said sporting goods are camouflaged apparel.

12. The foamed polymeric material of claim 1, wherein the material is used in footwear.

13. The foamed polymeric material of claim 11, wherein said footwear includes shoes.

14. The foamed polymeric material of claim 1, wherein the material is used in vehicles.

15. The foamed polymeric material of claim 8, wherein the material is used in recreational water vehicles.

16. The foamed polymeric material of claim 1, wherein the material is used in military equipment.

* * * * *